United States Patent
Hodgman et al.

(10) Patent No.: US 8,904,525 B1
(45) Date of Patent: Dec. 2, 2014

(54) TECHNIQUES FOR DETECTING MALWARE ON A MOBILE DEVICE

(75) Inventors: Roy Hodgman, Wenham, MA (US); Samir D. Saklikar, Mumbai (IN); Kevin D. Bowers, Melrose, MA (US)

(73) Assignee: EMC Corporation, Hopkinton, MA (US)

( * ) Notice: Subject to any disclaimer, the term of this patent is extended or adjusted under 35 U.S.C. 154(b) by 220 days.

(21) Appl. No.: 13/536,355

(22) Filed: Jun. 28, 2012

(51) Int. Cl.
  *G06F 12/14* (2006.01)
  *G06F 21/56* (2013.01)

(52) U.S. Cl.
  CPC ............. *G06F 21/562* (2013.01); *G06F 21/56* (2013.01); *G06F 2201/815* (2013.01)
  USPC .......................................................... 726/22

(58) Field of Classification Search
  CPC .. G06F 21/56; G06F 21/562; G06F 2201/815
  USPC ................................................ 726/22, 23, 24
  See application file for complete search history.

(56) References Cited

U.S. PATENT DOCUMENTS

| | | | |
|---|---|---|---|
| 8,001,082 B1 * | 8/2011 | Muratov | 707/634 |
| 8,233,882 B2 | 7/2012 | Rogel | |
| 8,341,749 B2 | 12/2012 | Rogel | |
| 8,370,934 B2 | 2/2013 | Tsviatkou et al. | |
| 8,387,141 B1 | 2/2013 | Zhukov et al. | |
| 8,391,834 B2 | 3/2013 | Raleigh | |
| 8,396,465 B2 | 3/2013 | Danford et al. | |
| 8,438,256 B2 | 5/2013 | Rogel et al. | |
| 8,549,644 B2 | 10/2013 | Sallam | |
| 8,549,648 B2 | 10/2013 | Sallam | |
| 2009/0036111 A1 * | 2/2009 | Danford et al. | 455/419 |
| 2009/0199219 A1 * | 8/2009 | Rofougaran et al. | 719/330 |
| 2011/0145920 A1 * | 6/2011 | Mahaffey et al. | 726/22 |

* cited by examiner

*Primary Examiner* — Ellen Tran
(74) *Attorney, Agent, or Firm* — BainwoodHuang

(57) ABSTRACT

A technique to detect malware on a mobile device which stores a virtual machine image involves establishing a connection from an electronic malware detection apparatus to the mobile device, the electronic malware detection apparatus being external to the mobile device. The technique further involves transferring mobile device data from the mobile device to the electronic malware detection apparatus through the connection to form a copy of the virtual machine image within the electronic malware detection apparatus. The technique further involves performing, by the electronic detection apparatus, a set of malware detection operations on the copy of the virtual machine image to determine whether the mobile device is infected with malware.

21 Claims, 5 Drawing Sheets

TECHNIQUES FOR DETECTING MALWARE ON A MOBILE DEVICE

BACKGROUND

A conventional approach to detecting malware on a smart phone involves porting malware detection tools which currently exist for traditional computers (e.g., laptops, desktops, servers, etc.) to the smart phone. Such malware detection tools include antispyware, anti-virus software, etc.

Once the malware detection tools are installed on the smart phone, the tools typically run in the background in a manner similar to the way they run on traditional computers. That is, the tools inspect files at rest and other running software on the smart phone and, if the tools discover malware, the tools attempt to quarantine and block further operation of that malware.

SUMMARY

Unfortunately, there are deficiencies to the above-described conventional approach of porting malware detection tools which currently exist for computers to smart phones. For example, smart phone resources such as power, processing cycles, and memory space are typically limited. As a result, it is relatively expensive to run malware detection tools on a smart phone.

Additionally, some advanced malware may be able to avoid detection by blocking certain functions, hiding certain files, etc. For such advanced malware, only deeper probing or observing operation from outside the smart phone may be able to detect the existence of malware in the smart phone.

Moreover, although porting malware detection tools from computers to smart phones is possible since smart phone architectures are becoming similar to traditional computers, various smart phone characteristics make such a porting approach less than desirable. For example, since smart phones run on batteries and use slower processors, running malware detection tools reduces smart phone usability in terms of operating life and responsiveness. Moreover, because processing, power, storage and communication resources on smart phones are limited, existing malware detection schemes are not tailored for these resource limited environments. Along these lines, some smart phone operating systems such as iOS do not allow persistent background tasks making it difficult for anti-virus-style solutions to operate effectively. Furthermore, smart phone use habits may vary widely from user to user thus providing obstacles and inconsistencies in timely updating and/or upgrading the malware detection tools, or even the underlying operating system and the tools it exposes, on the smart phones.

In contrast to the above-described conventional approach to porting malware detection tools to smart phones, an improved technique involves detecting malware on a mobile device by capturing a virtual machine image of the mobile device, and interrogating the virtual machine image on an electronic malware detection apparatus to determine whether malware exists on the mobile device. Such testing of the virtual machine image in a manner which is detached from the mobile device itself frees such testing from the limitations of the mobile device (e.g., battery power, processing cycles, etc.) and avoids reducing usability of the mobile device to its user. Additionally, such testing of the virtual machine image by the electronic malware detection apparatus (e.g., an electronic sandbox) enables deep probing (e.g., close memory inspection) as well as observation from the outside in order to detect advanced malware which is configured to take steps to avoid detection. Furthermore, such testing can be done in a collaborative manner to take advantage of knowledge about malware behavior on other mobile devices of the user.

One embodiment is directed to a method of detecting malware on a mobile device which stores a virtual machine image. The method includes establishing a connection from an electronic malware detection apparatus to the mobile device, the electronic malware detection apparatus being external to the mobile device. The method further includes transferring mobile device data from the mobile device to the electronic malware detection apparatus through the connection to form a copy of the virtual machine image within the electronic malware detection apparatus. The method further includes performing, by the electronic detection apparatus, a set of malware detection operations on the copy of the virtual machine image to determine whether the mobile device is infected with malware.

In some arrangements, the method further includes, prior to transferring the mobile device data from the mobile device to the electronic malware detection apparatus, transitioning the mobile device from (i) a normal operating mode in which the mobile device data is allowed to dynamically change (e.g., a smart phone engaged in a call or running applications with open files) to (ii) a quiesced mode in which the mobile device data is unchanging (e.g., where all smart phone applications are closed or suspended in an otherwise static state). In particular, the electronic malware detection apparatus maintains the mobile device in the quiesced mode, and reads the mobile device data from the mobile device through the connection while the mobile device is maintained in the quiesced mode to prevent the mobile device data from changing while being read.

In some arrangements, reading the mobile device data from the mobile device through the connection includes (i) copying only portions of the virtual machine image through the connection while the mobile device is maintained in the quiesced mode, and (ii) merging, by the electronic detection apparatus, the copied portions of the virtual machine image with other portions previously stored in the electronic malware detection apparatus to form the copy of the virtual machine image. Such operation minimizes the amount of data that passes through the connection (e.g., by copying only changed blocks), as well as transmission time and power consumed.

In other arrangements, reading the mobile device data from the mobile device through the connection includes copying the virtual machine image in its entirety through the connection while the mobile device is maintained in the quiesced mode. Such a comprehensive operation guarantees that the electronic malware detection apparatus receives a complete copy of the virtual machine image to interrogate.

Other embodiments are directed to systems, apparatus, processing circuits, computer program products, and so on. Some embodiments are directed to various methods, electronic components and circuitry which are involved in detecting malware on mobile devices.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Improved techniques involve detecting malware on mobile devices by capturing virtual machine images of the mobile devices, and interrogating the virtual machine images using an electronic malware detection apparatus to determine whether malware exists on the mobile devices. Such testing of virtual machine images in a manner which is detached from the mobile devices frees such testing from limitations of the mobile devices (e.g., battery power, processing cycles, etc.) and avoids reducing usability of the mobile devices. Moreover, such testing of the virtual machine images by the electronic malware detection apparatus enables parallel testing, deep probing (e.g., close memory inspection) as well as observation from the outside in order to detect advanced malware which is configured to take steps to avoid detection.

Figure 1:
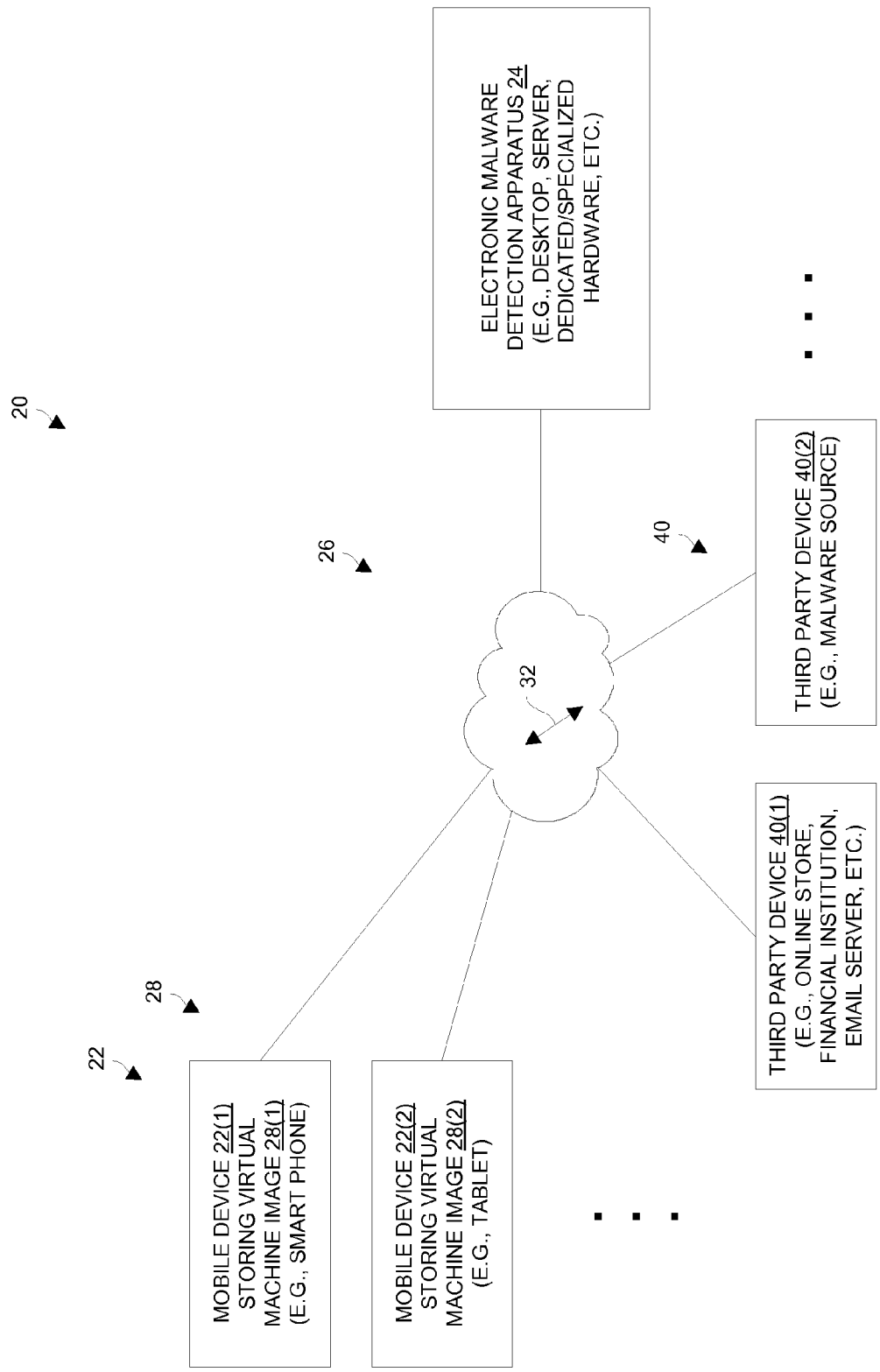
FIG. 1 is a block diagram of an electronic environment which is suitable for detecting malware on a mobile device.

FIG. 1 shows an electronic environment 20 which is suitable for detecting whether malware exists on a mobile device via testing of a virtual machine image of the mobile device. The electronic environment 20 includes mobile devices 22(1), 22(2), . . . (collectively, mobile devices 22), an electronic malware detection apparatus 24, and a communications medium 26.

Each mobile device 22 stores a virtual machine (VM) image 28, and is constructed and arranged to run a set of applications on behalf of a user and thus perform useful work. For example, the mobile device 22(1) stores a VM image 28(1) and may be a smart phone with cellular network and Internet access capabilities. As another example, the mobile device 22(2) stores a VM image 28(2) and may be a tablet-style device with similar access to wireless mobile Internet services. Other user-operated mobile devices 22 are suitable for use as well (e.g., portable gaming devices, thin client devices, and so on).

The electronic malware detection apparatus 24 is constructed and arranged to acquire the VM images 28 from the mobile devices 22 and interrogate the VM images 28 to determine whether the mobile devices 22 are infected with malware. Such interrogation is independent of the limitations of the mobile devices 22 (e.g., memory and processor restrictions, power limitations, etc.), and is capable of including any and all available techniques to detect malware in the VM image copies. In some arrangements, the electronic malware detection apparatus 24 is robustly provisioned with resources (e.g., an electronic sandbox, multiple desktops, multiple servers, etc.) which is able to duplicate VM images 28 and run multiple tests on the duplicated VM images 28 in parallel.

The communications medium 26 connects the various components of the electronic environment 20 together to enable these components to exchange electronic signals 32 (e.g., see the double arrow 32). At least a portion of the communications medium 26 is illustrated as a cloud to indicate that the communications medium 26 is capable of having a variety of different topologies including backbone, hub-and-spoke, loop, irregular, combinations thereof, and so on.

Along these lines, the communications medium 26 may include copper-based data communications devices and cabling, fiber optic devices and cabling, wireless devices, combinations thereof, etc.

In some arrangements, the communications medium 26 includes a computer network and the mobile devices 22 communicate through the computer network to the electronic malware detection apparatus 24 (i.e., the electronic malware detection apparatus 24 operates as a security server on a network with respect to the mobile devices 22). In other arrangements, the communications medium 26 includes physical cabling (e.g., a USB cable, etc.) perhaps exchanging data as well as recharging the mobile device 22 (e.g., the electronic malware detection apparatus 24 takes the form of a desktop or user workstation to which the user docks the mobile device 22 on a routine basis). In yet other arrangements, at least a portion of the communications medium 26 is wireless (e.g., Bluetooth, WiFi, cellular-based, etc.) thus enabling the mobile device 22 to periodically synchronize and query other devices when in range.

As mentioned above, each mobile device 22 locally stores a VM image 28 which contains a virtual machine state of that mobile device 22. In some arrangements, the VM image 28 takes the form a file (e.g., .vmdk, .vhd, or .vdi, etc.). In other arrangements, the VM image 28 takes the form of multiple files or multiple snapshots which can be periodically captured and effectively represent the entire state of a particular mobile device 22. In some arrangements, phone circuitry within the mobile device 22 continues to operate while a snapshot is loading.

It should be understood that data within the VM image 28 is capable of changing while the mobile device 22 operates in a normal operating mode. However, the data within the VM image 28 is made static and thus is capable of being reliably copied while the mobile device 22 operates in a quiesced mode.

During operation, each mobile device 22 operates in the normal operating mode in order to perform useful work on behalf of a user. In particular, a user is able to access third party devices 40(1), 40(2), (collectively, third party devices 40) via a mobile device 22. For example, in the context of a smart phone, the user is able to download and run apps, browse the Internet, perform transactions, send and receive email, play games, purchase and play music, text colleagues, etc. as well as make and answer traditional cellular calls. In the context of a tablet, similar operations can be performed.

While the mobile device 22 is in the normal operating mode, the data of the locally stored VM image 28 changes due to user operation (e.g., webpage downloads, exchanged emails, downloaded apps, and so on). It should be understood that, during such operation, the risk exists that the mobile device 22 acquires malware (e.g., a virus, hidden key-logging code, etc.) from a malicious third party device 40 (see third party device 40(2)) and the user may be unaware that the mobile device 22 has become infected.

Each mobile device 22 further operates in quiesced mode in order to enable the electronic malware detection apparatus 24 to obtain a copy of the VM image 28 of that mobile device 22. In some arrangements, the electronic malware detection apparatus 24 automatically transitions a mobile device 22 from the normal operating mode to the quiesced mode in response to a particular event (e.g., discovery of the mobile device 22, a timer, a determination that the mobile device 22 has become inactive for a period of time, etc.).

When the mobile device 22 transitions from normal operating mode to quiesced mode, the mobile device 22 places the VM image 28 in a closed, readable state in which the data of the VM image 28 is no longer changing. At this point, the electronic malware detection apparatus 24 copies data from the mobile device 22 (e.g., the entire VM image 28, data blocks which have changed since a last copy event to update an earlier copy of the VM image 28, etc.) in order to obtain a current copy of the VM image 28 on the electronic malware detection apparatus 24.

Once the electronic malware detection apparatus 24 acquires a copy of the VM image 28 from the mobile device 22, the electronic malware detection apparatus 24 tests the copy of the VM image 28 to determine whether the mobile device 22 is infected with malware.

It should be understood that the mobile device 22 may transition from the quiesced mode back to the normal operating mode in response to another event (e.g., when the electronic malware detection apparatus 24 has completed copying of the VM image 28, upon activation by the user, etc.). Further details will now be provided with reference to FIG. 2.

Figure 2:
FIG. 2 is a block diagram of an electronic malware detection apparatus of the electronic environment of FIG. 1.

FIG. 2 shows particular details of the electronic malware detection apparatus 24. As shown, the electronic malware detection apparatus 24 includes a communications interface 50, a user interface 52, local memory 54, and control circuitry 56.

The communications interface 50 is constructed and arranged to connect the electronic apparatus 40 to the communications medium 26 (also see FIG. 1). Accordingly, the communications interface 50 enables the electronic malware detection apparatus 24 to electronically communicate with the other components of the electronic environment 20.

The user interface 52 is constructed and arranged to receive input from a user and provide output to the user. Along these lines, the user interface 52 includes a keyboard, mouse and display to enable the user to enter commands (e.g., to copy VM images 28, to run malware detection tools, to adjust operating settings, etc.), to monitor operation, to view detection results, and so on.

The local memory 54 is intended to represent both volatile memory (e.g., semiconductor-based memory) and non-volatile memory (e.g., disk memory) of the electronic malware detection apparatus 24. As shown, the local memory 54 includes, among other things, virtualization software 60 and VM image interrogation tools 62.

The control circuitry 56 is constructed and arranged to use the various constructs stored in the memory 54 such as the virtualization software 60 and the VM image interrogation tools 62. In particular, when the control circuitry 56 executes the virtualization software 60, the control circuitry 56 creates a virtualization environment for virtual machines and is able to run a VM image 28 obtained from a mobile device 22. When the control circuitry 56 executes the VM image interrogation tools 62, the control circuitry 56 is able to test the VM image 28 for the presence of malware. If the presence of malware is detected in the VM image 28 (directly or indirectly through operation observation), the mobile device 22, which is the source of the VM image 28, is considered to be infected with malware.

It should be understood that the control circuitry 56 can be implemented in a variety of ways including via one or more processors running specialized software, field programmable gate arrays (FPGAs) and associated programs, application specific ICs (ASICs), discrete components, analog circuits, other hardware circuitry, combinations thereof, and so on. In the context of one or more processors running specialized software, a computer program product 70 is capable of delivering all or portions of the software to the electronic malware detection apparatus 24. The computer program product 70 has a non-transitory (or non-volatile) computer readable medium which stores a set of instructions which controls one or more operations of the electronic malware detection apparatus 24. Examples of suitable computer readable storage media include tangible articles of manufacture and apparatus which store instructions in a non-volatile manner such as CD-ROM, flash memory, disk memory, tape memory, and the like.

During operation, the electronic malware detection apparatus 24 extracts a VM image 28 from a mobile device 22. If the mobile device 22 has an architecture in which a virtual machine runs on mobile hardware, such operation may involve simply copying the VM image 28 (or data blocks which have changed since an earlier copy was captured) from the mobile device 22 to the electronic malware detection apparatus 24. On the other hand, the electronic malware detection apparatus 24 may periodically capture snapshots of the mobile device 22 and create a VM image 28 from the individual snapshots. Such snapshots may include information about the file system, the memory, CPU state and network state. It should be understood that, when the electronic malware detection apparatus 24 acquires this data, the mobile device 22 operates in a quiesced mode in which the data is at rest.

Once the copy of the VM image 28 is obtained by the electronic malware detection apparatus 24, the electronic malware detection apparatus 24 is able to apply various techniques to detect whether malware is present. In particular, for each technique in use today and for those being researched and studied, the electronic malware detection apparatus 24 creates a separate copy of the VM image 24 and runs that technique on a virtual machine based on that copy. Along these lines, one technique scans all the files looking for the presence of known malicious executable code. Another technique creates hashes of all files looking for matches on a blacklist. Another technique extracts the state of the memory of the virtual machine and probes it for known malware. Still another technique does not interact with the virtual machine directly at all, but instead watches how the virtual machine communicates with the outside world and monitors what it writes to disk and memory (through virtual machine methods which are not typically detectible from software running within the virtual machine). One will appreciate that, as more techniques prove to be fruitful, they too can be added to the repertoire.

By using different methods of malware detection, there is no taxing of resources of the mobile device 22 (except when creating a snapshot or copying a VM image 28). Rather, once the VM image 28 is copied to the electronic malware detection apparatus 24, there is much more room to develop techniques which avoid being detected by malware, and the apparatus 24 takes advantage of multiple (potentially overlapping) techniques at the same time. Additionally, the apparatus 24 can extend or intensify existing mobile malware detection methods which have been optimized to be run on mobile devices 22, either by using a larger database of file hashes, or more thoroughly inspecting memory, retaining network activity for longer periods of time, and so on. Accordingly, the apparatus 24 is capable of enjoying as much processing capability, power, storage or data transmission as the user of the apparatus 24 is willing to allocate. Further details will now be provided with reference to FIG. 3.

Figure 3:
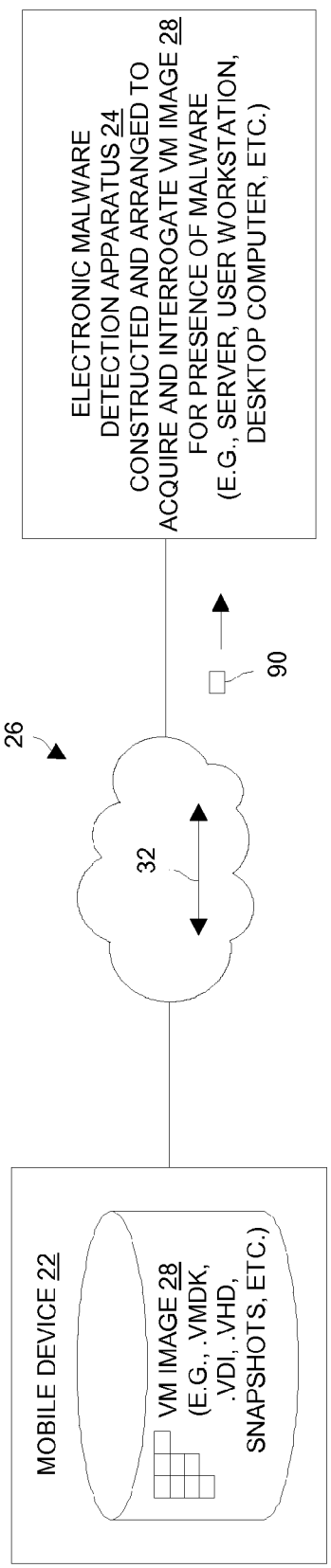
FIG. 3 is a block diagram of particular details of certain operations performed by the electronic environment of FIG. 1.

FIG. 3 shows the process performed by the electronic malware detection apparatus 24 when obtaining a copy of the VM image 28 which resides in the mobile device 22. In particular, the electronic malware detection apparatus 24 and the mobile device 22 cooperate to form a bi-directional communications pathway through the communications medium 26. Once the electronic malware detection apparatus 24 realizes that the pathway is formed (e.g., due to a connection success signal indicating successful formation of the bi-directional communications pathway), the electronic malware detection apparatus 24 automatically launches a docking operation which involves, among other things, copying at least portions of the VM image 28 from the mobile device 22.

In some arrangements, the electronic malware detection apparatus 24 reads the entire VM image 28 (or all of the snapshots that form the VM image 28) from the mobile device 22. Although this arrangement heavily consumes bandwidth of the communications medium 26, this arrangement guarantees that all of the mobile device data 90 of the VM image is current.

In other arrangements, the electronic malware detection apparatus 24 reads only blocks that have changed since the last time the electronic malware detection apparatus 24 acquired a copy of the VM image 28 from the mobile device 22. This arrangement consumes less bandwidth of the communications medium 26, but may be more compute intensive on the side of the mobile device 22.

In yet another arrangement, the electronic malware detection apparatus 24 creates the VM image 28 based on the current state of the mobile device 22. As mentioned earlier, such state may include the memory, the file-system and other supporting information about the mobile device 22.

Once a copy of the VM image 28 is fully available on the electronic malware detection apparatus 24, the electronic malware detection apparatus 24 is able to exhaustively interrogate the copy of the VM image 28 for the presence of malware. Further details will now be provided with reference to FIG. 4.

Figure 4:
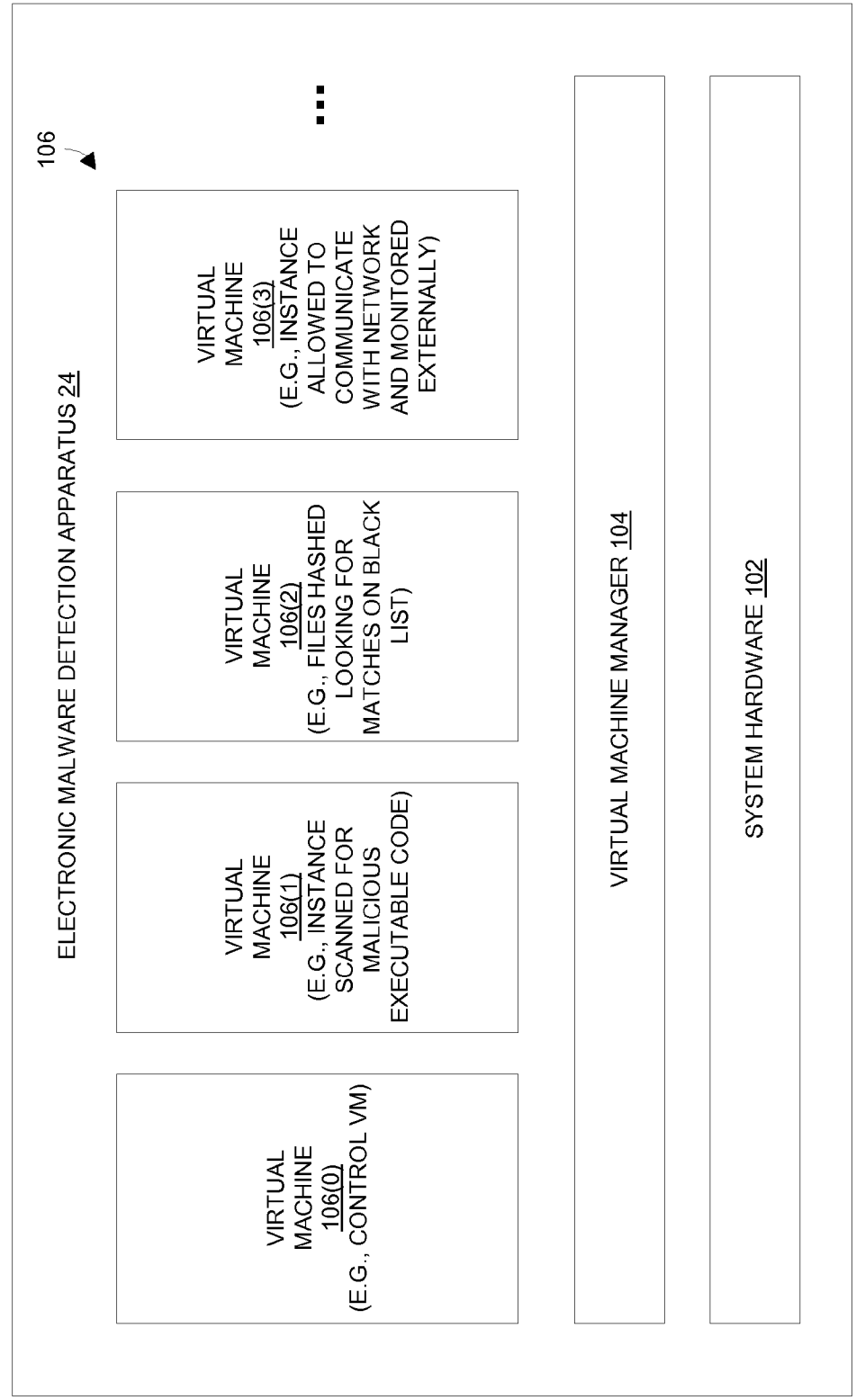
FIG. 4 is a block diagram of further details of the operations performed by the electronic environment of FIG. 1.

FIG. 4 shows an example sandbox layout 100 for the electronic malware detection apparatus 24. As shown, the layout 100 includes the system hardware 102, and a virtual machine manager (VMM) 104 which runs on the system hardware 102. The VMM provides a virtualization environment in which multiple virtual machines 106 are able to operate.

By way of example, the sandbox layout 100 includes a virtual machine 106(0) which operates as a control VM enabling the user to control the apparatus 24 such as instantiate new virtual machines, terminate existing virtual machines, re-allocate resources, and so on. Alternatively, a machine external to the sandbox layout 100 is able to remotely direct operation the various virtual machines 106 in the sandbox layout 100.

The sandbox layout 100 further includes a virtual machine 106(1) which runs tools to inspect its file system for malicious executable code. Additionally, the sandbox layout 100 includes a virtual machine 106(2) which runs tools to hash its files and look for matches on a black list. Furthermore, the sandbox layout 100 includes a virtual machine 106(3) which runs tools to exercise particular mobile device features while the operations of the virtual machine 106(3) are monitored externally (e.g., while one or more monitoring VMs monitor network traffic, memory management, and so on). That is, for the virtual machine 106(3), there is little or no direct interaction with the clone of the mobile device 22 at all, but instead the clone is monitored (e.g., how the clone communicates with the outside world, what the clone writes to disk and memory, etc.) via virtual machine methods which are not typically detectable by software running in a virtual machine. These tests along with additional tests are able to run in parallel.

It should be understood that not all operations must be performed within the virtualization environment. For example, the VM image 28 can be examined outside the layout 100 for malicious executable code, hash matches, etc. Along these lines, one should appreciate that, while the VMM 104 provides access to network traffic flowing into and out of the VMs 106, there are other network points of view which provide similar insight.

One should appreciate that the electronic malware detection apparatus 24 enables existing mobile malware detection methods which have been optimized to be run on mobile devices to be intensified. For example, with the apparatus 24 having more resources available, the apparatus 24 is able to use a larger database of file hashes, more thoroughly inspect memory, retain network activity for longer periods of time, and so on. For instance, a method which analyzes system initiated (not user initiated) network traffic is limited by the amount of storage that can be set aside to store this traffic for analysis. However, a virtual clone of a mobile device 22 running that same method would be able to allocate as much storage as is needed to store network data for an amount of time deemed sufficient to identify malware reliably. Further details will now be provided with reference to FIG. 5.

Figure 5:
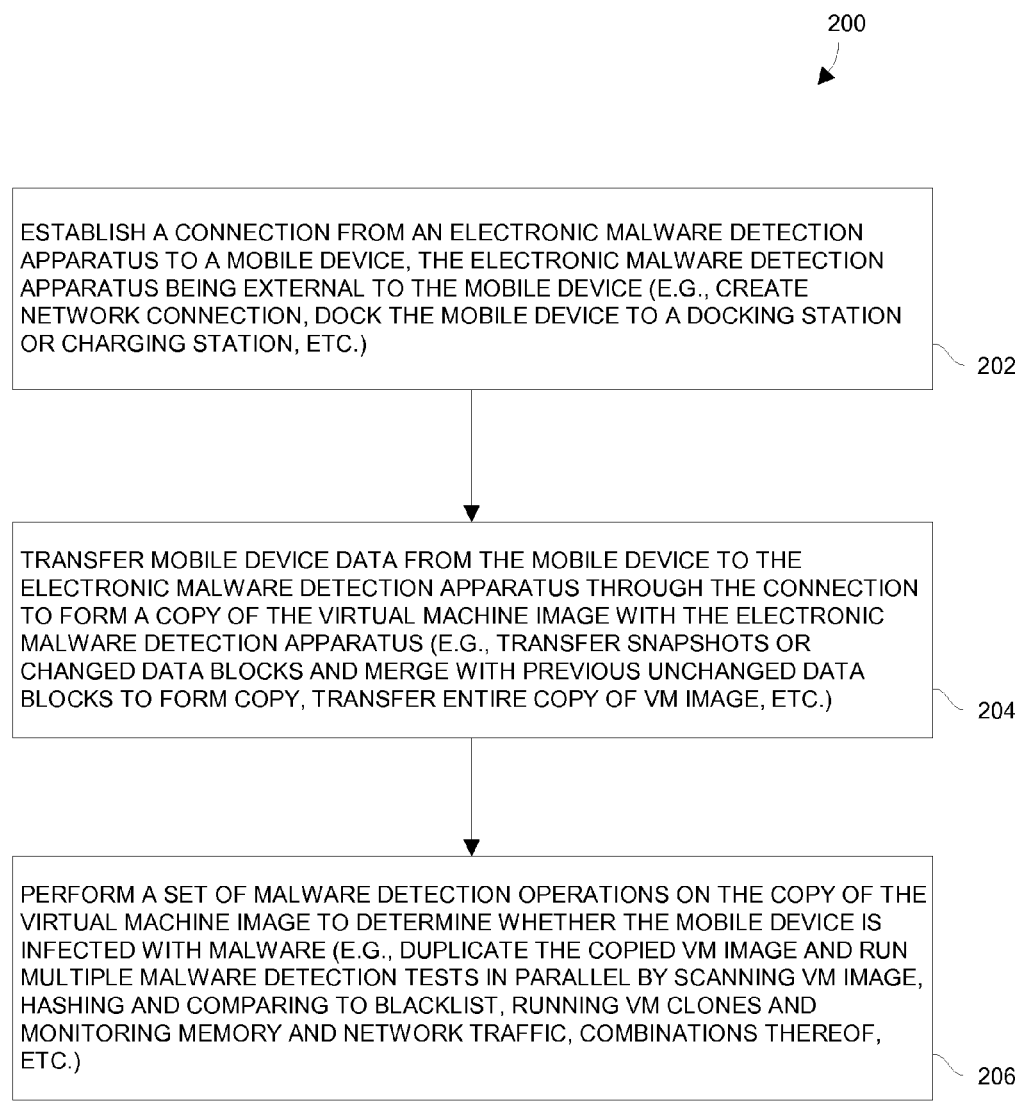
FIG. 5 is a flowchart of a procedure which is performed by the electronic environment of FIG. 1.

FIG. 5 shows a procedure 200 which is performed by the electronic malware detection apparatus 24. In step 202, the electronic malware detection apparatus 24 and a mobile device 22 establish a connection (also see FIGS. 1 and 3). In some arrangements, the electronic malware detection apparatus 24 is a security server and the mobile device 22 connects with the electronic malware detection apparatus 24 over a computer network. In other arrangements, the mobile device 22 docks with the electronic malware detection apparatus 24 (e.g., to synchronize data and recharge, etc.).

In step 204, the electronic malware detection apparatus 24 obtains mobile device data 90 (FIG. 3) from the mobile device 22 to form a copy of a VM image 28 of the mobile device 22 locally within the electronic malware detection apparatus 24. In some arrangements, only recently changed data blocks or snapshots are transferred from the mobile device 22 to the electronic malware detection apparatus 24 through the connection. In other arrangements, the entire VM image 28 is copied through the connection.

In step 206, the electronic malware detection apparatus 24 performs a set of malware detection operations on the copy of the VM image 28 to determine whether the mobile device 22 is infected with malware. For example, as shown in FIG. 4, the copy of the VM image 28 is duplicated and multiple malware detection tests are performed in parallel on the duplicated copies via a virtualization platform.

As mentioned above, an improved technique involves detecting malware on a mobile device 22 by capturing a virtual machine image 28 of the mobile device 22, and interrogating the virtual machine image 28 on an electronic malware detection apparatus 24 to determine whether malware exists on the mobile device 22. Such testing of the virtual machine image 28 in a manner which is detached from the mobile device 22 itself frees such testing from the limitations of the mobile device 22 (e.g., battery power, processing cycles, etc.) and avoids reducing usability of the mobile device 22 to its user. Additionally, such testing of the virtual machine image 28 by the electronic malware detection apparatus 24 (e.g., an electronic sandbox) enables deep probing (e.g., close memory inspection) as well as observation from the outside in order to detect advanced malware which is configured to take steps to avoid detection.

While various embodiments of the present disclosure have been particularly shown and described, it will be understood by those skilled in the art that various changes in form and details may be made therein without departing from the spirit and scope of the present disclosure as defined by the appended claims.

For example, it should be understood that the above-described operations of the electronic malware detection apparatus 24 can distributed among one or more servers (i.e., in the cloud). Accordingly, the copied VM image 28 can be moved to different specialized platforms for a variety of optimizations, e.g., load balancing, specialized inspection, further evaluation of suspect VM images 28, etc.

Additionally, it should be understood that the above-described electronic environment 20 is suitable for an enterprise which issues mobile devices 22 to its employees. In particular, the enterprise may issue each employee a mobile device 22 and a desktop computer which runs mobile device imaging software. Accordingly, the desktop computer of each employee is able to obtain a VM image 28 from that employee's mobile device 22. The desktop computer is then able to transfer the VM image 28 to the electronic malware detection apparatus 24 over a network. Upon receipt of the VM image 28, the electronic malware detection apparatus 24 schedules the VM image 28 for inspection.

In some arrangements, the enterprise interrogates VM images 28 of its employees based on the sensitivity of the employee (e.g., inspection of VM images 28 of high priority employees in the morning, inspection of VM images 28 of low priority employees in the afternoon or evening, etc.). In other arrangements, the enterprise interrogates VM images 28 of its employees based on the sensitivity of the data stored on the mobile devices 22. Other scheduling and prioritization techniques are suitable as well (e.g., scheduling based on behavior, previously seen malware detection, and so on).

The electronic malware detection apparatus 24 is further able to provide reports, individual notifications of detected malware, alerts, statistical analysis and aggregated findings, and so on. In some arrangements, the electronic malware detection apparatus 24 is constructed and arranged to follow a rule-based policy for inspection and detection of malware.

Additionally, it should be understood that the mobile devices 22 were described above as storing VM images 28 by way of example only. For these situations, the mobile devices 22 may have a hypervisor-based architecture and thus store and operate based on the VM images 28. In other arrangements, a VM image 28 is created based on the data from a mobile device 22. Such data may include information about the filesystem, memory and CPU state of the mobile device 22. In these other arrangements, the mobile device 22 is not-VM based but nevertheless enables formation of a VM image 28 which undergoes malware testing. It should be understood that various smart phone operating systems provide several layers of abstraction on top of the ultimate hardware thus enabling easy virtualization of such devices to form VM images 28.

Furthermore, it should be understood that the above-described improvements are suitable for use in remediation/recovery. Along these lines, suppose that a user docks the user's mobile device 22 at night to enable overnight malware detection by the electronic malware detection apparatus 24. When the user, wakes up in the morning, the user is given a clean image or just white-listed files that are loaded on to the mobile device 22. Here, the electronic malware detection apparatus 24 is equipped with a clean code base which it is able to use not only for comparison purposes (i.e., malware detection), but also for safely provisioning the mobile device 22 for future use. In some arrangements, the electronic malware detection apparatus 24 stores the last known non-infected VM image 28 and reverts to that. Such modifications and enhancements are intended to belong to various embodiments and arrangements.

What is claimed is:

1. A method of detecting malware on a mobile device which stores a virtual machine image, the method comprising:
   establishing a connection from an electronic malware detection apparatus to the mobile device, the electronic malware detection apparatus being external to the mobile device;
   transferring mobile device data from the mobile device to the electronic malware detection apparatus through the connection to form a copy of the virtual machine image within the electronic malware detection apparatus;
   performing, by the electronic detection apparatus, a set of malware detection operations on the copy of the virtual machine image to determine whether the mobile device is infected with malware; and
further comprising:
   prior to transferring the mobile device data from the mobile device to the electronic malware detection apparatus, transitioning the mobile device from (i) a normal operating mode in which the mobile device data is allowed to dynamically change to (ii) a quiesced mode in which the mobile device data is unchanging.

2. A method as in claim 1 wherein transferring the mobile device data from the mobile device to the electronic malware detection apparatus includes:
   maintaining the mobile device in the quiesced mode, and
   reading the mobile device data from the mobile device through the connection while the mobile device is maintained in the quiesced mode to prevent the mobile device data from changing while being read.

3. A method as in claim 2 wherein reading the mobile device data from the mobile device through the connection includes:
   copying the virtual machine image in its entirety through the connection while the mobile device is maintained in the quiesced mode.

4. A method as in claim 2 wherein reading the mobile device data from the mobile device through the connection includes:
   copying only portions of the virtual machine image through the connection while the mobile device is maintained in the quiesced mode, and
   merging, by the electronic detection apparatus, the copied portions of the virtual machine image with other portions previously stored in the electronic malware detection apparatus to form the copy of the virtual machine image.

5. A method as in claim 2 wherein the copy of the virtual machine image within the electronic malware detection apparatus includes a set of mobile device files; and wherein performing the set of malware detection operations on the copy of the virtual machine image includes:
   scanning the set of mobile device files for known malicious executable code, and outputting a notification in response to discovery of such known malicious executable code.

6. A method as in claim 2 wherein the copy of the virtual machine image within the electronic malware detection apparatus includes a set of mobile device files; and wherein performing the set of malware detection operations on the copy of the virtual machine image includes:
   generating a hash of each mobile device file, comparing that hash to a list of known hashes of malicious files, and outputting a notification in response to discovery of match between a generated hash and a known hash on the list.

7. A method as in claim 2 wherein performing the set of malware detection operations on the copy of the virtual machine image includes:
   running a local virtual machine in the electronic malware detection apparatus using the copy of the virtual machine image, probing memory of the local virtual machine for known malware, and outputting a notification in response to discovery of such known malware.

8. A method as in claim 2 wherein performing the set of malware detection operations on the copy of the virtual machine image includes:
   running a local virtual machine in the electronic malware detection apparatus using the copy of the virtual machine image, monitoring network communications and memory resulting from operation of the local virtual machine to determine whether the mobile device is infected with malware.

9. A method as in claim 2 wherein the copy of the virtual machine image within the electronic malware detection apparatus includes a set of mobile device files; and wherein performing the set of malware detection operations on the copy of the virtual machine image includes:
   scanning the set of mobile device files for known malicious executable code, and outputting a notification in response to discovery of such known malicious executable code;
   concurrently generating a hash of each mobile device file, comparing that hash to a list of known hashes of malicious files, and outputting a notification in response to discovery of match between a generated hash and a known hash on the list;
   concurrently running a first local virtual machine in the electronic malware detection apparatus using the copy of the virtual machine image, probing memory of the first local virtual machine for known malware, and outputting a notification in response to discovery of such known malware; and
   concurrently running a second local virtual machine in the electronic malware detection apparatus using the copy of the virtual machine image, monitoring network communications and memory resulting from operation of the second local virtual machine to determine whether the mobile device is infected with malware.

10. A method as in claim 1 wherein establishing the connection from the electronic malware detection apparatus to the mobile device includes:
   electronically discovering the mobile device from an interface of the electronic malware detection apparatus,
   forming, as the connection, a bi-directional communications pathway between the mobile device and the electronic malware detection apparatus, and
   in response to formation of the bi-directional communications pathway, outputting a connection success signal indicating successful formation of the bi-directional communications pathway.

11. A method as in claim 10 wherein transferring the mobile device data is part of a docking operation between the mobile device and the electronic malware detection apparatus, and wherein the method further comprises:
   automatically launching the docking operation in response to the connection success signal.

12. A method as in claim 1, further comprising:
   after the virtual image which is stored on the mobile device is copied from the mobile device, interrogating the copy of the virtual machine image to identify a particular sensitivity level of the copy of the virtual machine image;
   before performing the set of malware operations on the copy of the virtual machine image, performing sets of malware detection operations on other copies of other virtual machine images having sensitivity levels which are higher than the particular sensitivity level; and
   after performing the set of malware operations on the copy of the virtual machine image, performing sets of malware detection operations on other copies of other virtual machine images having sensitivity levels which are lower than the particular sensitivity level;
   the order of performance of the sets of malware operations on the other copies of the other virtual machine images being based on the sensitivity levels of the other copies of the other virtual machine images.

13. A method as in claim 1 wherein transitioning the mobile device from the normal operating mode to the quiesced mode occurs in response to detection that the mobile device has electronically docked with the electronic malware detection apparatus; and
   wherein the method further comprises replacing the virtual machine image stored in the mobile device with a replacement virtual machine image while the mobile device remains docked to the electronic malware detection apparatus.

14. An electronic malware detection apparatus, comprising:
   an interface circuit;
   memory; and
   a control circuit coupled to the interface circuit and the memory, the control circuit being constructed and arranged to detect malware on a mobile device which stores a virtual machine image by:
      establishing a connection to the mobile device through the interface circuit,
      transferring mobile device data from the mobile device to the memory through the connection to form a copy of the virtual machine image within the memory, and
      performing a set of malware detection operations on the copy of the virtual machine image to determine whether the mobile device is infected with malware;
   wherein the control circuit is further constructed and arranged to:
      prior to transferring the mobile device data from the mobile device to the memory, transition the mobile device from (i) a normal operating mode in which the mobile device data is allowed to dynamically change to (ii) a quiesced mode in which the mobile device data is unchanging.

15. An electronic malware detection apparatus as in claim 14 wherein transferring the mobile device data from the mobile device to the memory includes:
   maintaining the mobile device in the quiesced mode, and
   reading the mobile device data from the mobile device through the connection while the mobile device is maintained in the quiesced mode to prevent the mobile device data from changing while being read.

16. An electronic malware detection apparatus as in claim 14 wherein the control circuit is further constructed and arranged to:
   interrogate the copy of the virtual machine image to identify a particular sensitivity level of the copy of the virtual machine image;
   before performing the set of malware operations on the copy of the virtual machine image, perform sets of malware detection operations on copies of virtual machine images having sensitivity levels which are higher than the particular sensitivity level; and after performing the set of malware operations on the copy of the virtual machine image, perform sets of malware detection operations on copies of virtual machine images having sensitivity levels which are lower than the particular sensitivity level;

the order of performance of the sets of malware operations on the copies of the virtual machine images by the control circuit being based on the sensitivity levels of the copies of the virtual machine images.

17. An electronic malware detection apparatus as in claim 16 wherein transitioning the mobile device from the normal operating mode to the quiesced mode by the control circuit occurs in response to detection that the mobile device has electronically docked with the electronic malware detection apparatus; and wherein the control circuit is further constructed and arranged to replace the virtual machine image stored in the mobile device with a replacement virtual machine image while the mobile device remains docked to the electronic malware detection apparatus.

18. A computer program product which has a non-transitory computer readable medium storing a set of instructions which, when performed by an electronic malware detection apparatus, cause the electronic malware detection apparatus to:

establish a connection from the electronic malware detection apparatus to the mobile device, the electronic malware detection apparatus being external to the mobile device;

transfer mobile device data from the mobile device to the electronic malware detection apparatus through the connection to form a copy of the virtual machine image within the electronic malware detection apparatus; and perform a set of malware detection operations on the copy of the virtual machine image to determine whether the mobile device is infected with malware;

wherein the set of instructions further causes the electronic malware detection apparatus to:

prior to transferring the mobile device data from the mobile device to the electronic malware detection apparatus, transition the mobile device from (i) a normal operating mode in which the mobile device data is allowed to dynamically change to (ii) a quiesced mode in which the mobile device data is unchanging.

19. A computer program product as in claim 18 wherein transferring the mobile device data from the mobile device to the electronic malware detection apparatus includes:

maintaining the mobile device in the quiesced mode, and reading the mobile device data from the mobile device through the connection while the mobile device is maintained in the quiesced mode to prevent the mobile device data from changing while being read.

20. A computer program product as in claim 18 wherein the set of instructions further causes the electronic malware detection apparatus to:

interrogate the copy of the virtual machine image to identify a particular sensitivity level of the copy of the virtual machine image;

before performing the set of malware operations on the copy of the virtual machine image, perform sets of malware detection operations on copies of virtual machine images having sensitivity levels which are higher than the particular sensitivity level; and after performing the set of malware operations on the copy of the virtual machine image, perform sets of malware detection operations on copies of virtual machine images having sensitivity levels which are lower than the particular sensitivity level;

the order of performance of the sets of malware operations on the copies of the virtual machine images being based on the sensitivity levels of the copies of the virtual machine images.

21. A computer program product as in claim 20 wherein transitioning the mobile device from the normal operating mode to the quiesced mode occurs in response to detection that the mobile device has electronically docked with the electronic malware detection apparatus; and wherein the set of instructions further causes the electronic malware detection apparatus to replace the virtual machine image stored in the mobile device with a replacement virtual machine image while the mobile device remains docked to the electronic malware detection apparatus.

* * * * *